US010766448B2

(12) United States Patent
Wiscombe et al.

(10) Patent No.: US 10,766,448 B2
(45) Date of Patent: Sep. 8, 2020

(54) SIDE AIRBAG ASSEMBLY

(71) Applicant: Autoliv ASP, Inc., Ogden, UT (US)

(72) Inventors: Derek John Wiscombe, Morgan, UT (US); Don Larry Parker, Syracuse, UT (US); Terry Alan Wheelwright, Morgan, UT (US); Andrew Lawrence Holliday, Pleasant View, UT (US); Charles Paul Dinsdale, Farr West, UT (US); Bryant S. Whitcomb, Dublin, OH (US); Craig Allen Markusic, Marysville, OH (US)

(73) Assignees: Autoliv ASP, Inc., Ogden, UT (US); Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 15/996,036

(22) Filed: Jun. 1, 2018

(65) Prior Publication Data
US 2019/0366970 A1    Dec. 5, 2019

(51) Int. Cl.
*B60R 21/231* (2011.01)
*B60R 21/233* (2006.01)
(Continued)

(52) U.S. Cl.
CPC ...... *B60R 21/23138* (2013.01); *B60R 21/233* (2013.01); *B60R 21/013* (2013.01);
(Continued)

(58) Field of Classification Search
CPC ............ B60R 21/23138; B60R 21/233; B60R 2021/23107; B60R 2021/0006;
(Continued)

(56) References Cited

U.S. PATENT DOCUMENTS 5,556,128 A * 9/1996 Sinnhuber ......... B60R 21/23138
280/730.2
5,803,485 A   9/1998 Acker et al.
(Continued)

FOREIGN PATENT DOCUMENTS

DE           10323129      12/2004
DE       202006014012       2/2008
(Continued)

OTHER PUBLICATIONS

International Search Report and Written Opinion dated Aug. 26, 2019 for international application PCT/US2019/030200.

*Primary Examiner* — Darlene P Condra
(74) *Attorney, Agent, or Firm* — Stoel Rives LLP (57) ABSTRACT

A side inflatable airbag assembly for a vehicle is disclosed. Inflatable airbag assemblies may provide protection for an occupant in a vehicle collision event. In a side collision event, or other event producing lateral movement of the occupant relative to the vehicle, the disclosed inflatable airbag assembly may receive and support the occupant during ride down so as to prevent or minimize injury resulting from impact with a vehicle door, sidewall, center console, or other vehicle structure disposed lateral to the vehicle seating position. The disclosed airbag may differentially support the occupant buy providing varied degrees of support for the shoulder and pelvis, and the torso, which may be particularly beneficial to an elderly occupant whose bones may be more susceptible to some injury types and modes as a result of age-incident health issues.

20 Claims, 10 Drawing Sheets

(51) Int. Cl.
*B60R 21/013* (2006.01)
*B60R 21/00* (2006.01)
*B60R 21/261* (2011.01)

(52) U.S. Cl.
CPC ............. *B60R 2021/0006* (2013.01); *B60R 2021/0055* (2013.01); *B60R 2021/0058* (2013.01); *B60R 2021/23107* (2013.01); *B60R 2021/23316* (2013.01); *B60R 2021/23324* (2013.01); *B60R 2021/2615* (2013.01)

(58) Field of Classification Search
CPC .. B60R 2021/23316; B60R 2021/2615; B60R 2021/0058; B60R 2021/23324; B60R 2021/0055; B60R 21/013
See application file for complete search history.

(56) References Cited

U.S. PATENT DOCUMENTS

| | | | |
|---|---|---|---|
| 5,927,748 A | | 7/1999 | O'Driscoll |
| 6,349,964 B1 * | | 2/2002 | Acker ............... B60R 21/23138 280/730.1 |
| 7,168,733 B2 | | 1/2007 | Kumagai et al. |
| 7,611,164 B2 | | 11/2009 | Kai et al. |
| 8,282,126 B2 | | 10/2012 | Wiik et al. |
| 8,684,408 B2 | | 4/2014 | Thomas et al. |
| 10,391,966 B2 * | | 8/2019 | Kunisada ............... B60R 21/207 |
| 2003/0160433 A1 * | | 8/2003 | Kumagai ............... B60R 21/233 280/729 |
| 2003/0168836 A1 | | 9/2003 | Sato et al. |
| 2005/0006883 A1 * | | 1/2005 | Sato ................... B60R 21/23138 280/730.2 |
| 2005/0062266 A1 * | | 3/2005 | Steimke ............ B60R 21/23138 280/730.2 |
| 2006/0001244 A1 * | | 1/2006 | Taguchi ............ B60R 21/23138 280/729 |
| 2006/0022439 A1 * | | 2/2006 | Bayley .............. B60R 21/23138 280/729 |
| 2006/0071458 A1 * | | 4/2006 | Sendelbach ....... B60R 21/23138 280/729 |
| 2009/0212542 A1 * | | 8/2009 | Toda ..................... B60R 21/207 280/730.2 |
| 2011/0079991 A1 * | | 4/2011 | Ravenberg ........ B60R 21/23138 280/740 |
| 2012/0248447 A1 | | 10/2012 | Sugimoto et al. |
| 2015/0097359 A1 * | | 4/2015 | Rickenbach ...... B60R 21/23138 280/729 |
| 2015/0115583 A1 * | | 4/2015 | Azuma ................. B60R 21/231 280/740 |
| 2016/0159310 A1 * | | 6/2016 | Kobayashi ............ B60R 21/233 280/729 |
| 2016/0221528 A1 * | | 8/2016 | Sugimura ......... B60R 21/23138 |

FOREIGN PATENT DOCUMENTS

| | | |
|---|---|---|
| EP | 0590518 | 9/1993 |
| JP | 4720753 B2 | 9/2008 |

* cited by examiner

SIDE AIRBAG ASSEMBLY

TECHNICAL FIELD

The present disclosure relates generally to the field of automotive protective systems. More specifically, the present disclosure relates to airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. The present disclosure may afford protection particularly beneficial for an elderly occupant(s) whose bones may be more susceptible to some injury types and modes as a result of age-incident health issues, and more so when involved in a side-impact collision or other event producing lateral movement (e.g., transverse to a longitudinal axis of the vehicle) of the occupant(s). In the following disclosure, "airbag" generally refers to an inflatable airbag that deploys at a side position (or at a position generally laterally adjacent to a vehicle occupant position) to protect an occupant during a collision event.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

During installation, airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Some embodiments of the airbag assembly disclosed herein may be more suitable to cushion a front-seat passenger, while other embodiments may be more particularly suitable for passenger of a seat other than the front seat, such as a more rearward seat. An airbag assembly can mitigate injury to an occupant of a vehicle during a collision event by reducing the effect of impact of the occupant against structures (body-structure impact) within the vehicle (e.g., a door column, vehicle sidewall, center console).

Some embodiments disclosed herein can provide improved positioning, cushioning, and/or safety to occupants involved in particular types of collisions. For example, some embodiments can be configured to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the vehicle-forward direction.

Figure 1A:
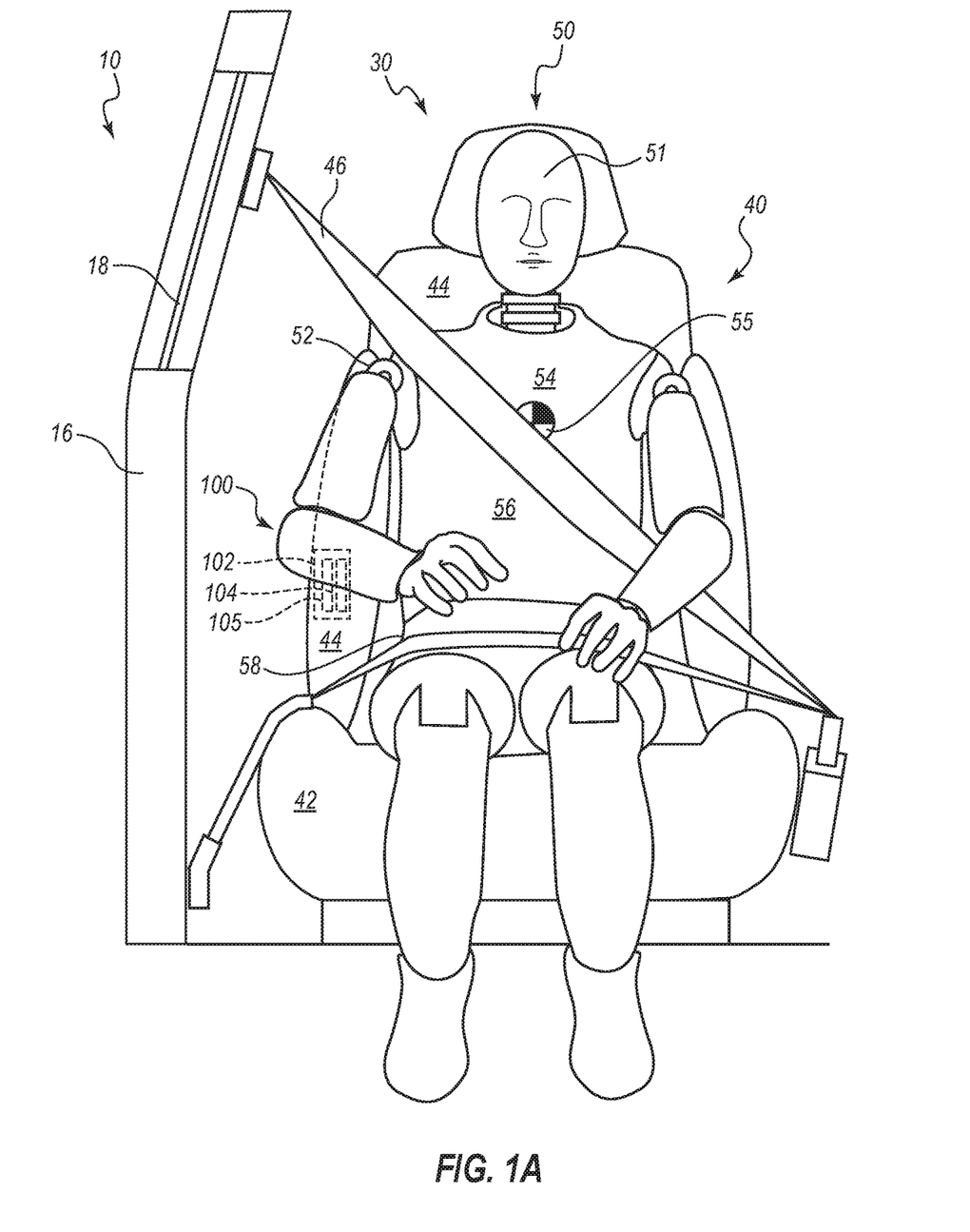
FIG. 1A is a front view of a portion of an interior of a vehicle having an inflatable airbag assembly according to an embodiment of this disclosure.

FIG. 1A is front view of a portion of an interior of a vehicle 10 having an inflatable airbag assembly 100, according to an embodiment of the present disclosure. A door or sidewall 16 and a window 18 are shown for reference. The vehicle 10 includes at least one vehicle seating position 30. The vehicle seating position 30 of FIG. 1A comprises a seat assembly 40. The seat assembly 40 comprises a seat 42, a seatback 44, and a restraint harness 46. An occupant 50 is shown in the seat assembly 40. A head 51, shoulder(s) 52, thorax 54, thoracic center 55, thoracoabdominal region 56, and pelvis 58 of the occupant 50 are shown for reference. The inflatable airbag assembly 100 may be coupled to the seatback 44.

The inflatable airbag assembly 100 comprises a housing 102 and an inflator 104. In some embodiments, the housing may comprise a second inflator 105. The housing 102, in one embodiment, may be mounted to an interior portion of the seatback 44. The inflator 104 may be coupled to the housing 102, and may be disposed partially or completely within the housing 102.

Although FIG. 1A and other figures may illustrate the occupant 50 with the restraint harness 46 employed, the operation of the inflatable airbag assembly 100 does not depend in any way on the restraint harness 46.

Figure 1B:
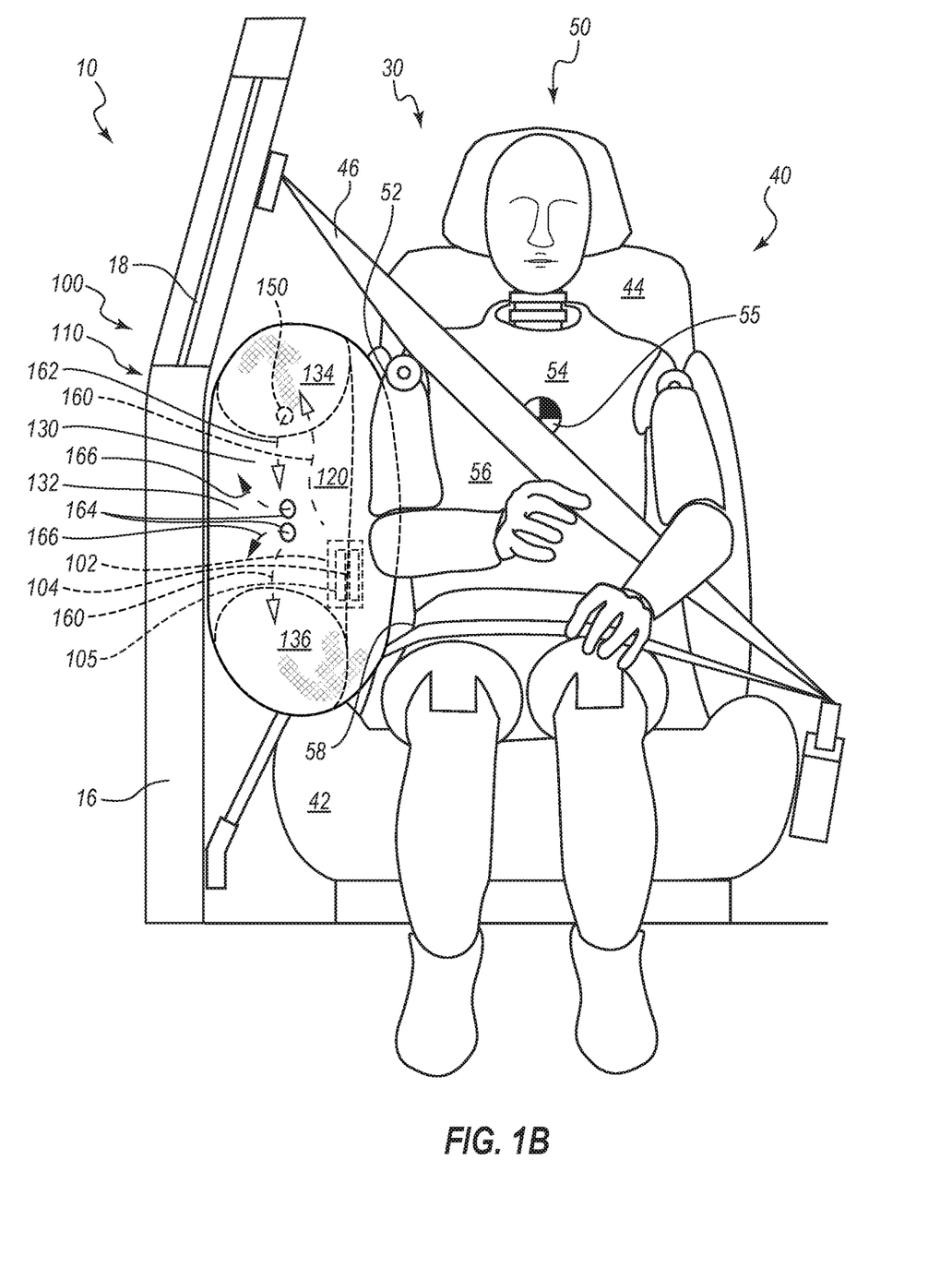
FIG. 1B is a front view of a portion of the interior of the vehicle having the inflatable airbag assembly of FIG. 1A deployed and at least partially inflated.

FIG. 1B is a front view of a portion of the interior of the vehicle 10 having the inflatable airbag assembly 100 of FIG. 1A deployed and at least partially inflated. The door/sidewall 16 and window 18 of the vehicle 10 are shown for reference. The vehicle seating position 30 and seat assembly 40, as well as the seat 42, seatback 44, and restraint harness 46 are shown for reference. The occupant 50 is shown seated in the seat assembly 40 prior to engaging the inflatable airbag assembly 100. The shoulder 52, thorax 54, thorax center 55, thoracoabdominal region 56 and pelvis 58 are shown for reference.

The inflatable airbag assembly 100 further comprises an inflatable airbag cushion 110. The inflatable airbag cushion 110 comprises an inflator port (not shown, but see, e.g., 106 in FIG. 2), a first chamber 120, and a second chamber 130. The inflatable airbag assembly 100 may be deployed by action of the inflator 104, which may be activated by, for example, the vehicle being involved in a collision event. The inflator 104 may provide inflation gas to the inflatable airbag cushion 110 via the inflator port 106, and may thereby cause the inflatable airbag cushion 110 to deploy from the housing 102 and begin inflating. The inflatable airbag cushion 110 may inflate to be disposed forward from the housing 102 at the seatback 44 to a position adjacent to the vehicle seating position 30 and, more particularly in at least one embodiment, between the vehicle seating position 30 and the door/sidewall 16 of the vehicle 10.

When in a deployed and fully inflated state, the first chamber 120 may be inflated to a first pressure and the second chamber 130 may be inflated to a second pressure, the second pressure of the second chamber 130 being greater than the first pressure of the first chamber 120. The first chamber 120 may also be referred to as a lower pressure chamber, and the second chamber 130 may also be referred to as a high pressure chamber, because the first, or low pressure, chamber is intended to perform at a lower pressure of inflation gas than is the second (high pressure) chamber.

In one embodiment, the second chamber 130 may be disposed interior to the first chamber 120, and the second chamber 130 may be coextensive with a portion of the first chamber 120. In other words, the second chamber 130 may be within and occupy a portion of the first chamber 120. The second chamber 130 comprises a generally vertical region 132, an upper region 134, and a lower region 136. The generally vertical region 132 may be in fluid communication with both the upper and lower regions 134, 136. The generally vertical region 132 of the second chamber 130 may be disposed adjacent to the seatback 44, with the upper and lower regions 134, 136 extending forward from the generally vertical region 132 of the second chamber 130 to be disposed adjacent to the occupant 50. The inflation port 106, in an embodiment, may provide 160 inflation gas directly to the second chamber 130. The second chamber 130 may include a valve 150. The valve 150 may be configured to permit communication of inflation gas from the second chamber 130 to the first chamber 120. The valve 150 may be further configured to provide 162 inflation gas to the first chamber 120 once the second pressure is achieved within the second chamber 130. The valve 150 may be further configured to prevent inflation gas from passing into the first chamber 120 unless and/or until a desired ratio of inflation gas pressure exists between the second chamber 130 and the first chamber 120. In other words, the valve 150 may remain closed until the second pressure is achieved in the second chamber 130, at which point the valve 150 may begin to admit 162 inflation gas to the first chamber 120; and the valve 150 may again close when the pressure of inflation gas within the first chamber 120 reaches a desired fractional ratio of the pressure within the second chamber 130, so that the second pressure within the second chamber 130 remains greater than the first pressure within the first chamber 120.

The first chamber 120 may comprise an exhaust vent 164 to exhaust 166 inflation gas from the inflatable airbag cushion 110. The exhaust vent 164 may be configured to first exhaust 166 inflation gas to exit the first chamber 120 when a desired pressure is achieved within the first chamber 120. In other words, the exhaust vent 164 may prevent inflation gas from exiting the inflatable airbag cushion 110 until a desired pressure is achieved in the first chamber 120. In one embodiment, the exhaust vent 164 may be configured to partially close if the pressure of inflation gas within the first chamber 120 falls below the desired pressure. In another embodiment, the exhaust vent 164 may be configured to remain open once the desired pressure of inflation gas within the first chamber 120 has first been achieved.

Figure 1C:
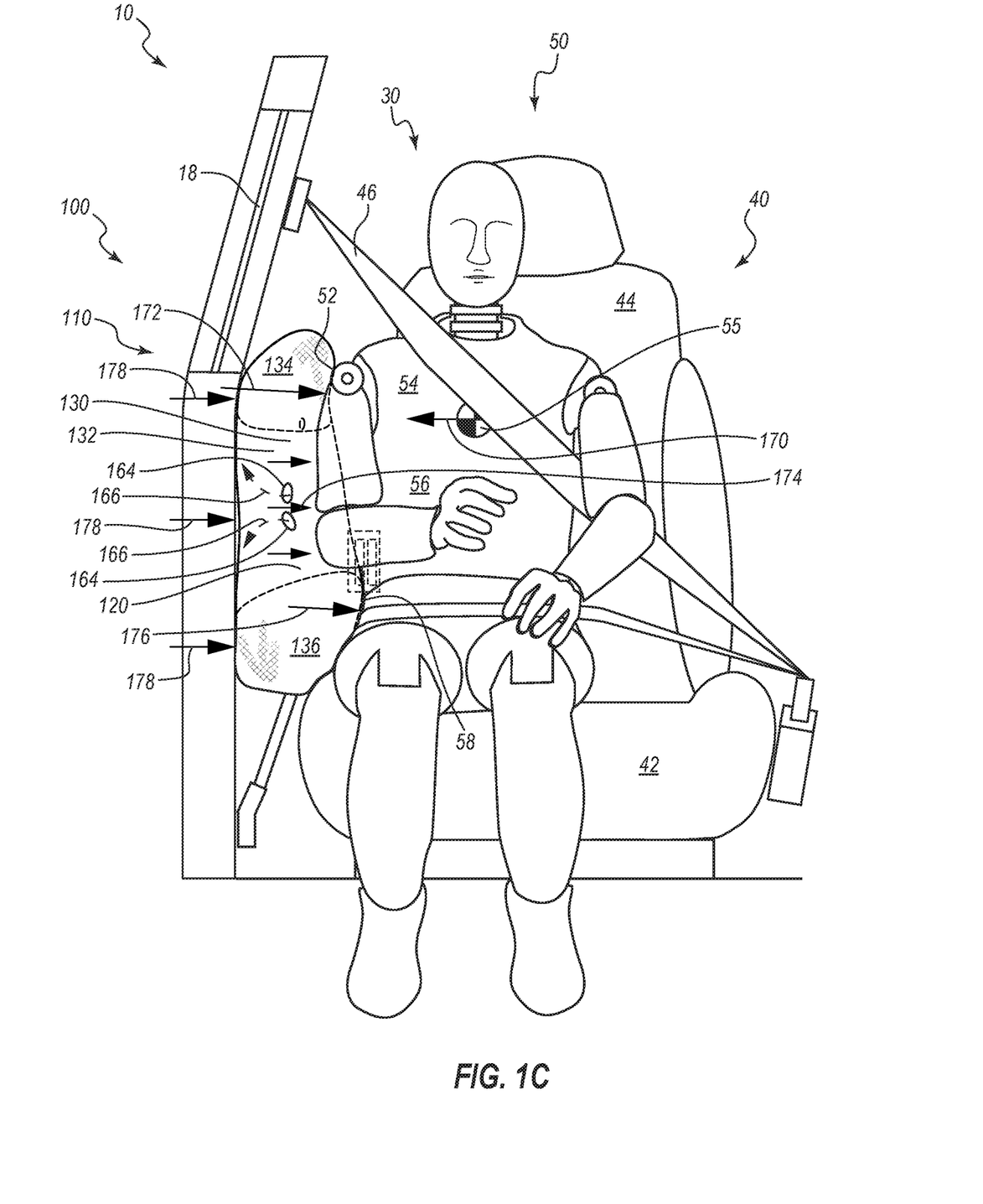
FIG. 1C is a front view of a portion of the interior of the vehicle having the inflatable airbag assembly of FIGS. 1A-1B in a deployed and at least partially inflated state, with the occupant engaging the inflatable airbag cushion.

FIG. 1C is a front view of a portion of the interior of the vehicle 10 having the inflatable airbag assembly 100 of FIGS. 1A-1B in a deployed and at least partially inflated state, with the occupant 50 engaging the inflatable airbag cushion 110. The occupant 50 is shown in the seat assembly 40 in the vehicle seating position 30. The thorax 54, thoracic center 55, thoracoabdominal region 56 and pelvis 58 of the occupant 50 are shown for reference, as are the seat 42, seatback 44 and restraint harness 46 of the seat assembly 40. The occupant 50 has traveled in a lateral direction 170 and is shown engaging 172, 174, 176 the inflatable airbag cushion 110. More particularly, thoracic center 55 is shifted (relative to FIG. 1B) in the lateral direction 170 and the shoulder 52 of the occupant 50 is engaging 172 the upper region 134 of the second chamber 130, the thoracoabdominal region 56 of the occupant 50 is engaging 174 the first chamber 120, and the pelvis 58 of the occupant 50 is engaging 176 the lower region 136 of the second chamber 130. In other words, the shoulder 52, thorax 54, and pelvis 58 may initially and simultaneously or nearly simultaneously engage 172, 174, 176 the first chamber 120, and, as the event continues, the shoulder 52 may further engage 172 the upper region 134 of the second chamber 130, and the pelvis 58 may further engage 176 the lower region 136 of the second chamber 130. The generally vertical region 132 of the second chamber 130 may be disposed adjacent to the seatback 44 and, thus, the thoracoabdominal region 56 of the occupant may engage 174 a region of the first chamber 120 through ride down. The door/sidewall 16 of the vehicle 10 may serve as a reaction surface to support 178 the inflatable airbag cushion 110. The first chamber 120 may assist in ensuring the upper and lower regions 134, 136 remain properly disposed to support the shoulder 52 and pelvis 58, respectively, during ride down.

The first chamber 120, as shown in FIG. 1C, has been inflated to the first pressure while the second chamber 130 has been inflated to a second pressure. The second pressure of the second chamber 130 is greater than the first pressure of the first chamber 120. The shoulder 52 and pelvis 58 may engage, respectively, the upper and lower regions 134, 136 of the second chamber 130. The thoracoabdominal region 56 may engage the first chamber 120. In other words, the inflatable airbag cushion 110 may be configured to receive and support the shoulder 52 and pelvis 58 of the occupant 50 at the upper and lower regions 134, 136 having the second (higher) pressure of the second chamber 130 and to receive and support the thoracoabdominal region 56 at the first chamber 120 having the first (lower) inflation pressure. Both the shoulder 52 and pelvis 58 of the occupant 50 may have greater integral strength from bone structure than does the thoracoabdominal region 56 (nominally, the rib cage), in particular, in an elderly occupant whose bones may be more susceptible to some injury types and modes as a result of age-incident health issues. With the inflatable airbag cushion 110 configured to receive the shoulder 52 and pelvis 58 at the second (higher) pressure upper and lower regions 134, 136 of the second chamber 130, and to receive the thoracoabdominal region 56 at the first (lower) pressure first chamber 120, the occupant 50 may be received by the inflatable airbag cushion 110 and supported in a manner that may reduce injury to the occupant 50 generally, and to the thoracoabdominal region 56 particularly.

Figure 2A:
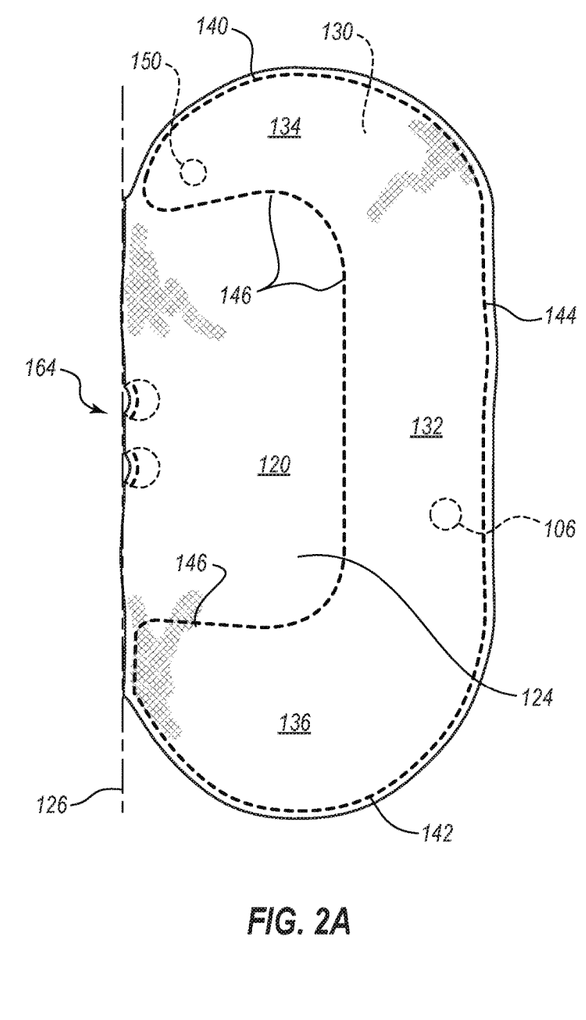
FIG. 2A is a side view of a side of the inflatable airbag cushion of FIGS. 1A-1C in an uninflated state.
Figure 2B:
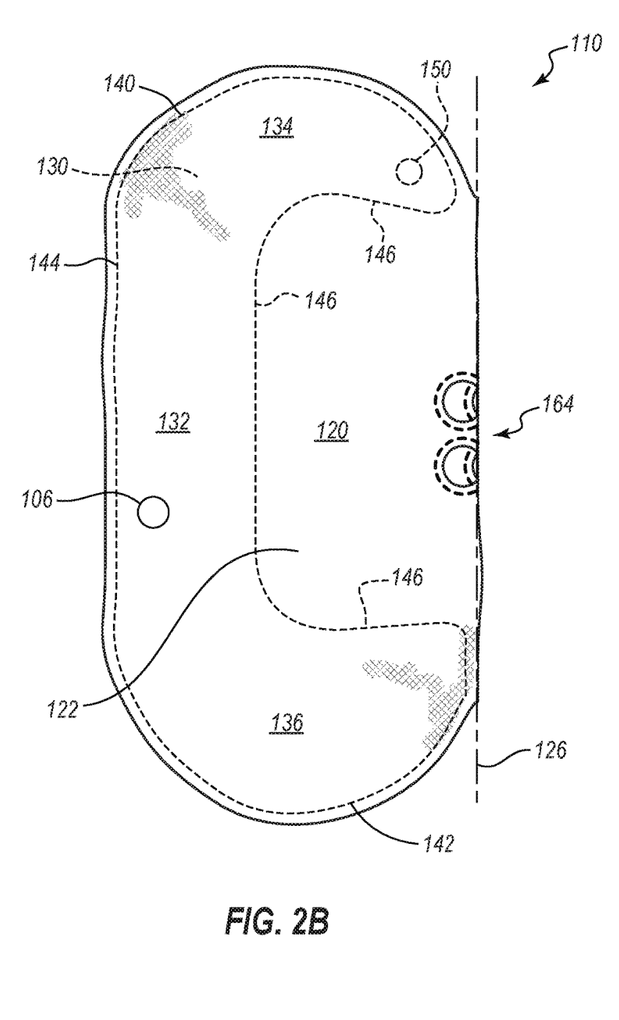
FIG. 2B is a side view of a second side of the inflatable airbag cushion of FIG. 2A.

FIG. 2A is a side view of a side of the inflatable airbag cushion 110 of FIGS. 1A-1C in an uninflated state. FIG. 2B is a side view of a second side of the inflatable airbag cushion 110 of FIG. 2A. With respect to FIGS. 2A and 2B, the inflatable airbag cushion 110 may include an inboard panel 122 and an outboard panel 124. In one embodiment, the inboard and outboard panels 122, 124 may form the first chamber 120. The inboard and outboard panels 122, 124 may be formed of a single unitary fabric panel, the fabric panel folded along a fold line 126 and coupled along an upper distal coupling 140, a lower distal coupling 142, and a rear distal coupling 144. The upper, lower, and rear distal coupling 140, 142, 144 may be formed of a continuous seam. A seam may be formed by sewing, adhesive, radio-frequency welding, taping, or in any other suitable manner or combinations thereof. The first chamber 120 may have a generally obround shape wherein one cross-sectional dimension is greater than a perpendicular cross-sectional dimension. The exhaust vent 164 of the first chamber 120 is shown for reference. The first chamber 120 may comprise an inflator port 106. The inflation port 106 may comprise an aperture passing through the inboard panel 122 and to the interior of the second chamber 130. In other words, the inflator port 106 may be configured to admit inflation gas directly to the second chamber 130.

Figure 2C:
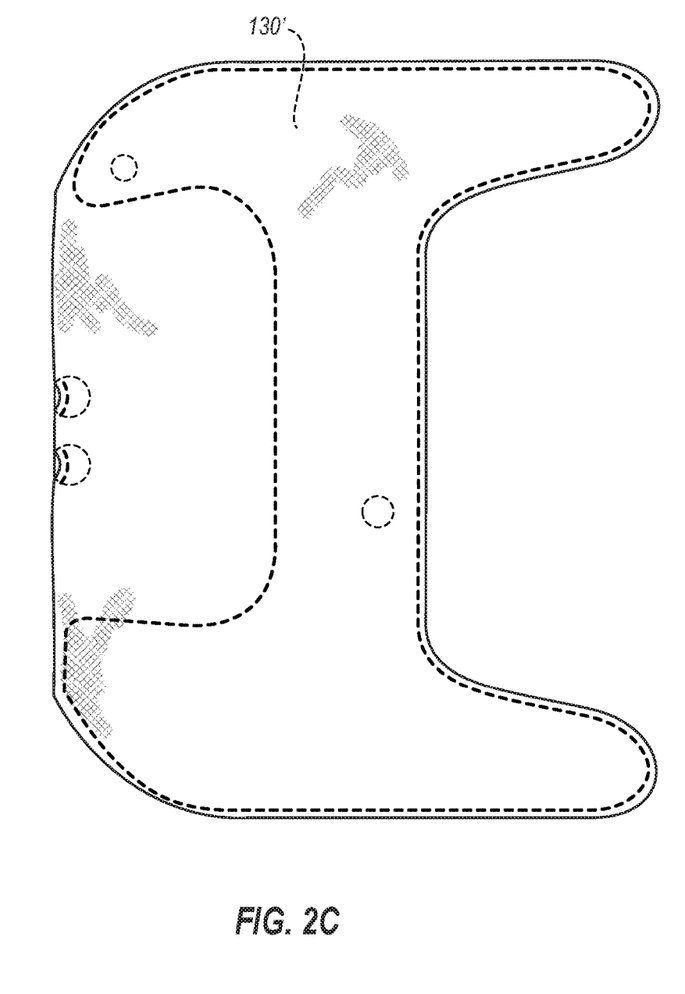
FIG. 2C is a side view of an inflatable airbag cushion according to one embodiment with a second chamber with a capitalized "I" shape.

In one embodiment, the second chamber 130 may be interior to and coextensive with a portion of the interior of the first chamber 120. In one embodiment, the second chamber 130 may have a shape generally resembling a "C." In another embodiment, the second chamber 130 may have a shape resembling a capitalized "I" having an upper horizontal member and a lower horizontal member, as shown in FIG. 2C. The second chamber 130 may couple to the first chamber 120 along the upper, lower, and rear distal couplings 140, 142, 144. More particularly, an upper portion of the upper region 134 of the second chamber 130 may couple at the upper distal coupling 140 to the first chamber 120. A lower portion of the lower region 136 may couple at the lower distal coupling 142 to the first chamber 120. A rear distal portion of the generally vertical region 132 may couple at the rear distal coupling 144 to the first chamber 120. The second chamber 130 may further couple to the first chamber 120 at the inboard panel 122 and along a medial coupling 146. In an embodiment, each of the upper, lower, and rear distal couplings 140, 142, 144 may comprise a seam joining the inboard panel 122 and outboard panel 124 of the first chamber 120.

The second chamber 130 may further comprise a valve 150 to permit inflation gas to communicate from the second chamber 130 to the first chamber 120. More particularly, in one embodiment, when the inflator 104 activates, inflation gas may pass through the inboard panel 122 of the first chamber 120 and enter the second chamber 130, thereby inflating the second chamber 130. Upon achieving the second pressure of the second chamber 130, the valve 150 may permit inflation gas to enter and begin inflating the first chamber 120.

Figure 3A:
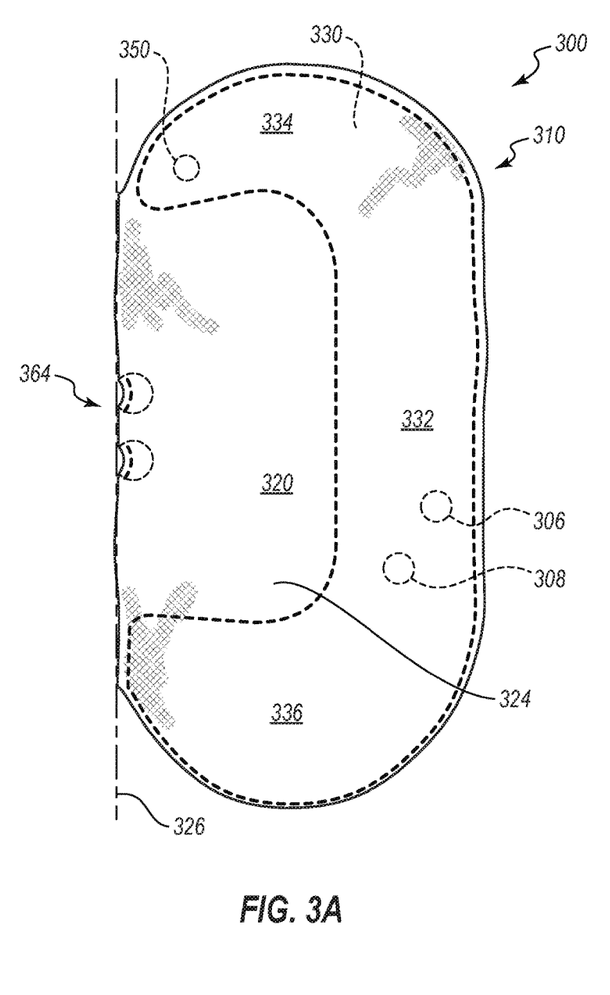
FIG. 3A is a side view of a side of an inflatable airbag cushion according to another embodiment of the present disclosure in an uninflated state.
Figure 3B:
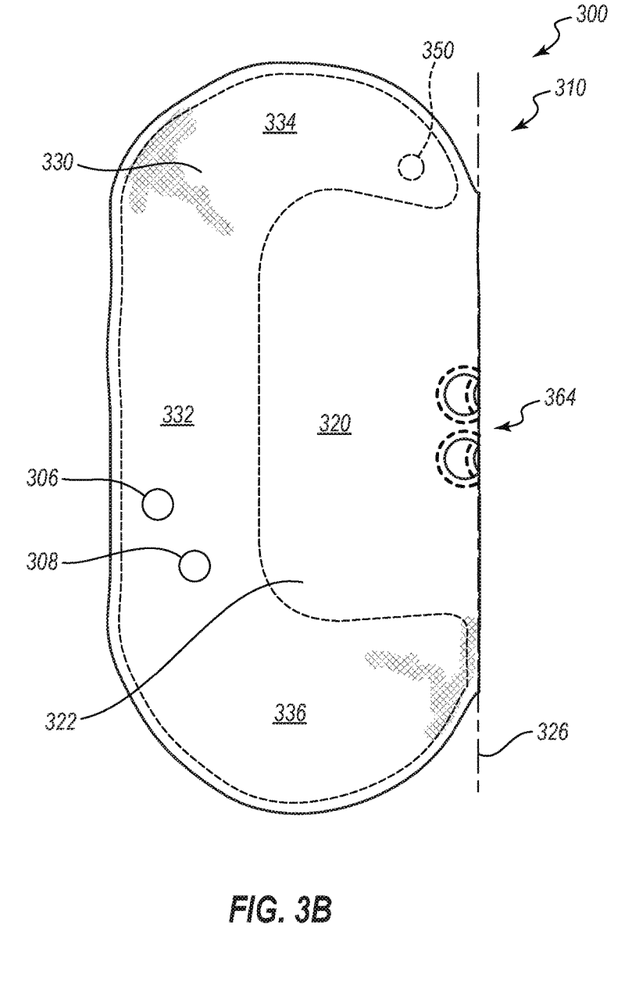
FIG. 3B is a side view of a second side of the inflatable airbag cushion of FIG. 3A.

FIGS. 3A and 3B depict an embodiment of an inflatable airbag assembly 300 that resembles the inflatable airbag assembly 100 described above in certain respects. Accordingly, like features are designated with like reference numerals, with the leading digits incremented to "3." For example, the embodiment depicted in FIGS. 3A and 3B includes an inflatable airbag cushion 310 that may, in some respects, resemble the inflatable airbag cushion 110 of FIGS. 1A-2B. Relevant disclosure set forth above regarding similarly identified features thus may not be repeated hereafter. Moreover, specific features of the inflatable airbag assembly 100 and related components shown in FIGS. 1A-2B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features can apply equally to the features of the inflatable airbag assembly 300 and related components depicted in FIGS. 3A and 3B. Any suitable combination of the features, and variations of the same, described with respect to the inflatable airbag assembly 100 and related components illustrated in FIGS. 1A-2B can be employed with the inflatable airbag assembly 300 and related components of FIGS. 3A and 3B, and vice versa. This pattern of disclosure applies equally to further embodiments depicted in subsequent figures and described hereafter, wherein the leading digits may be further incremented.

FIG. 3A is a side view of a side of an inflatable airbag cushion 310 according to an embodiment of this disclosure similar to the inflatable airbag cushion 110 of FIGS. 1A-2B in an uninflated state. FIG. 3B is a side view of a second side of the inflatable airbag cushion 310 of FIG. 3A. With respect to FIGS. 3A and 3B, the inboard panel 322, outboard panel 324 and fold line 326 are shown for reference, as are the first chamber 320 and second chamber 330, and the generally vertical region 332 and upper and lower regions 334, 336 of the second chamber 330. A first inflator port 306 and a second inflator port 308 may introduce inflation gas to the inflatable airbag cushion 310. More particularly, one of the inflator ports 306, 308 may be configured to introduce inflation gas directly into the first chamber 320 while the remaining inflator port 306, 308 may be configured to introduce inflation gas directly into the second chamber 330. For example, in an embodiment, each inflator port 306, 308 may be serviced by a distinct inflator, such as inflators 104 and 105. In another embodiment, each inflator port 306, 308 may be serviced by inflator plumbing delivering different volumes and/or pressures of inflation gas to the first and second chamber 320, 330. The exhaust vent 364 may be configured to permit inflation gas within the first chamber 320 to exit the first chamber 320 once the pressure of inflation gas within the first chamber 320 has reached a first pressure. The valve 350 of the second chamber 330 may be configured to remain closed until the pressure of inflation gas within the second chamber 330 has reached a second pressure, the second pressure of the second chamber 330 being greater than the first pressure of the first chamber 320. The difference in inflation gas pressure between the first and second chambers 320, 330 may have a preferred ratio or ratio range wherein the second pressure of the second chamber 330 is higher than the first pressure of the first chamber 320. The valve 350 of the second chamber 330 may be configured to permit inflation gas to flow from the second chamber 330 into the first chamber 320 while the pressure ratio is at the preferred ratio or within the preferred ratio range, and to restrict the flow of inflation gas from the second chamber 330 to first chamber 320 if the pressure ratio falls below the preferred pressure ratio or ratio range. The exhaust vent 364 of the first chamber 320 may be proportionally larger to permit adequate venting of inflation gas from the first chamber 320 so as to assist in achieving/maintaining the preferred pressure ratio or ratio range.

Figure 4A:
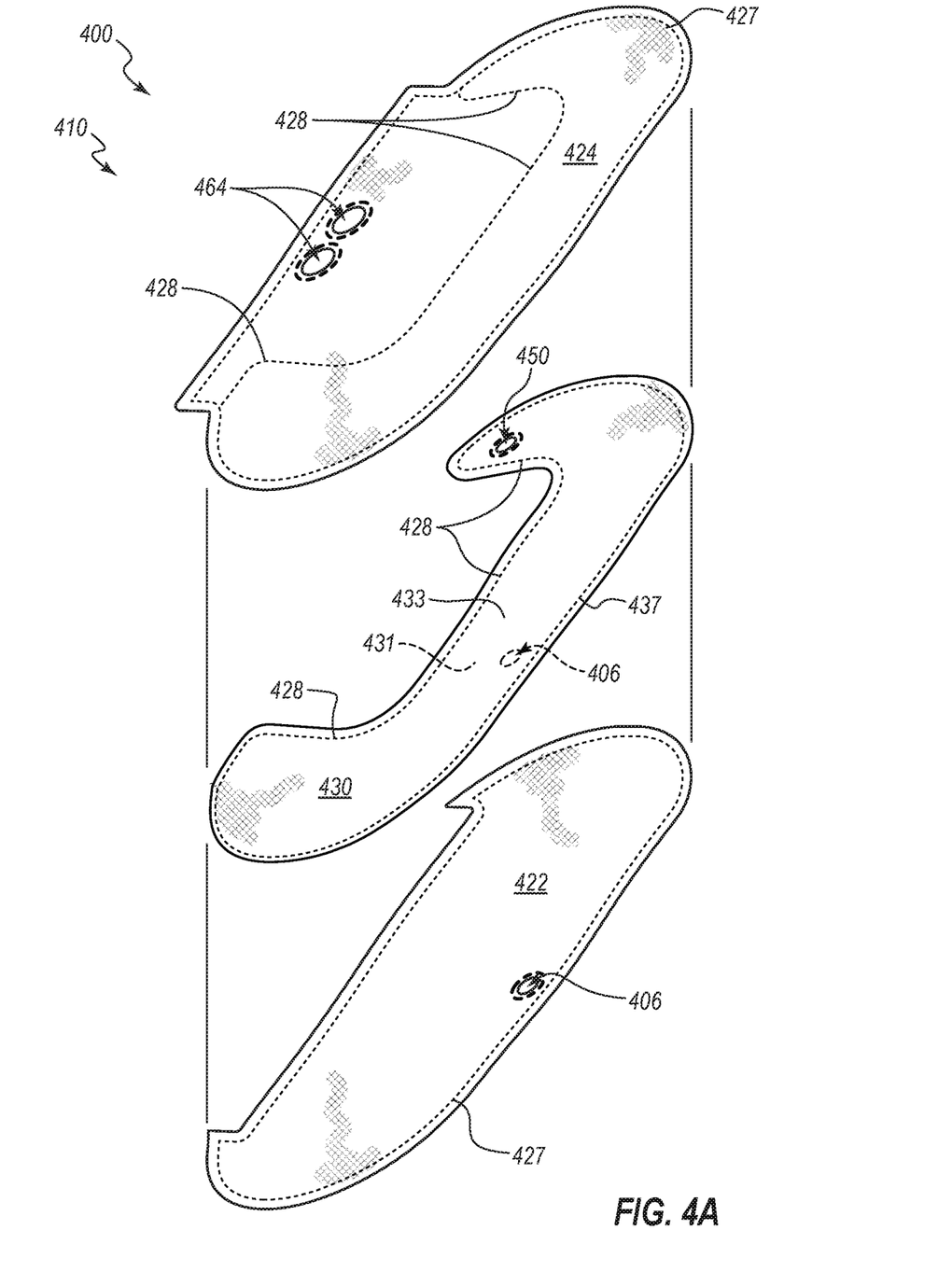
FIG. 4A is partially exploded perspective view of an inflatable airbag cushion of the inflatable airbag assembly, according to an embodiment of the present disclosure.

FIG. 4A is a partially exploded perspective view of an inflatable airbag cushion 410 of the inflatable airbag assembly 400 similar to the airbag cushion 310 of FIGS. 3A-3B, according to an embodiment of the present disclosure. The inboard panel 422 and outboard panel 424 may be distinct panels. The inboard and outboard panels 422, 424 may be coupled to each other along a first chamber perimeter seam 427 to form the first chamber (not shown, but see, e.g., 320 in FIGS. 3A, 3B) of the inflatable airbag cushion 410. The exhaust vent 464 of the first chamber 420 is shown for reference.

The second chamber 430 is shown in a partially assembled state. The second chamber 430 may be formed of two distinct panels (not shown) in a manner similar to the first chamber 420. The second chamber 430 of the inflatable airbag cushion 410 may be disposed within the first chamber 420 and may be coupled to and between the first and second panels 422, 424 at a portion of the first chamber perimeter seam 427 and a second chamber perimeter seam 437. The second chamber 430 may be further coupled to the outboard panel 424 at a medial coupling seam 428. The valve 450 of the second chamber 430 is shown for reference. The inflation port 406 through the inboard panel 422 and into the second chamber 430 is shown for reference.

In another embodiment, the second chamber 430 may comprise a single fabric panel (not shown) coupled to the outboard panel 424 along the second chamber perimeter seam 437 and medial coupling seam 428. In another embodiment, the second chamber 430 may comprise a single fabric panel coupled to the inboard panel 422 along the second chamber perimeter seam 437 and an alternative medial coupling seam (similar to the medial coupling seam 428).

Figure 4B:
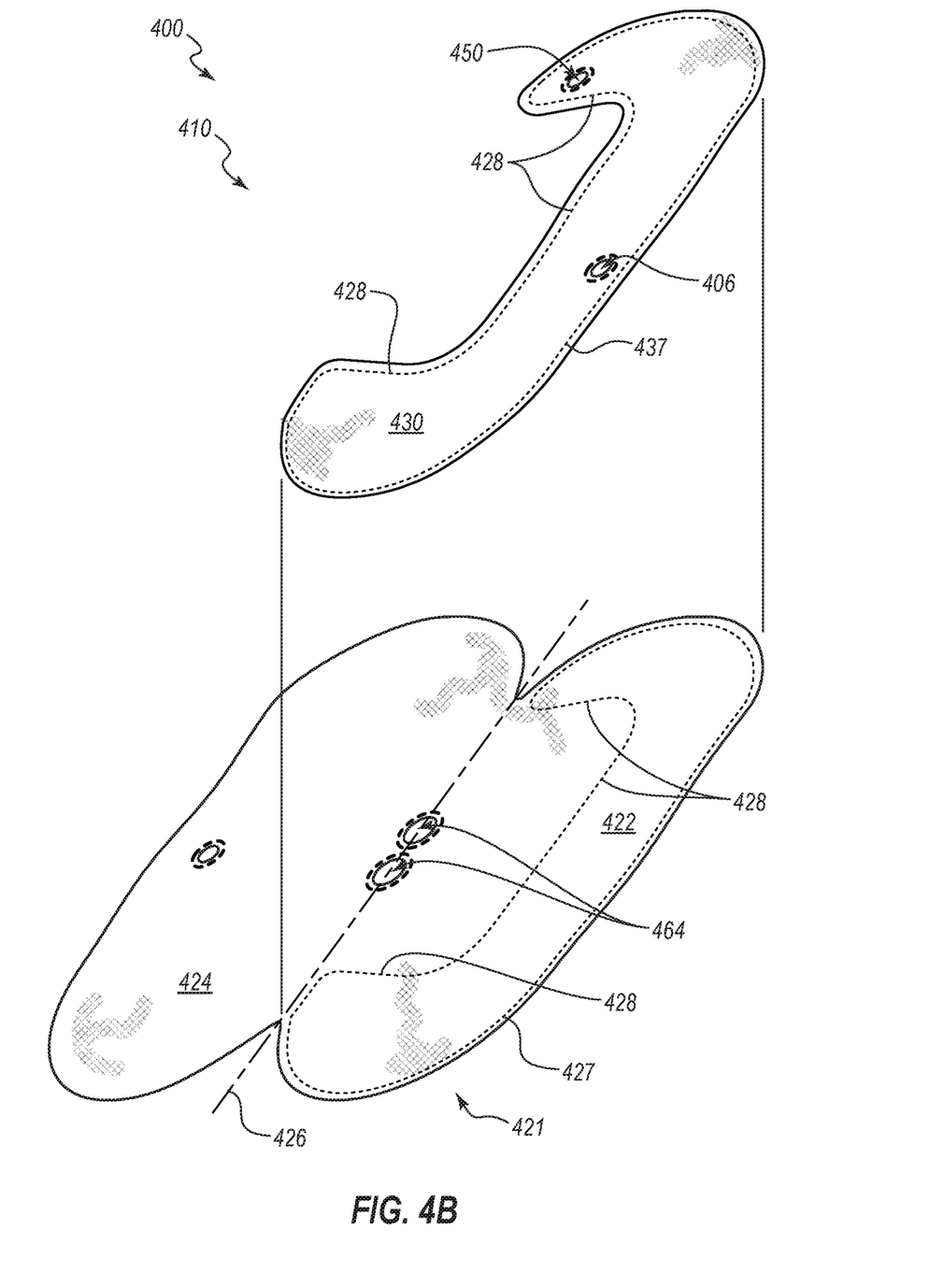
FIG. 4B is a partially exploded view of an inflatable airbag cushion of the inflatable airbag assembly, according to another embodiment of the present disclosure.

FIG. 4B is a partially exploded view of an inflatable airbag cushion 410 of the inflatable airbag assembly 400 similar to the inflatable airbag cushion 310 of FIGS. 3A-3B, according to an embodiment of the present disclosure. The inflation port 406, valve 450, and exhaust vent 464 are shown for reference. The inboard and outboard panels 422, 424 may be formed of a contiguous fabric panel 421. The second chamber 430 is shown in a partially assembled state. The second chamber 430 may be formed of a contiguous fabric panel (not shown) in a manner similar to the first chamber 420. The second chamber 430 may be assembled to the contiguous fabric panel 421 and the contiguous fabric panel 421 folded along the fold line 426 and coupled along the first chamber perimeter seam 427. A portion of the second chamber perimeter seam 437 may be coextensive with a corresponding portion of the first chamber perimeter seam 427. In an embodiment, the second chamber perimeter seam 437 and first chamber perimeter seam 427 may be comprised of a single seam where the first and second chamber perimeter seams 427, 437 are coextensive. The second chamber 430 may be further coupled to the outboard panel 424 along the medial coupling seam 428. In another embodiment, the second chamber 430 may be further coupled to the inboard panel 422 along an alternative medial coupling seam (not shown, but similar to the medial coupling seam 428).

In the embodiment of FIG. 4B, the inboard and outboard panels 422, 424 couple to each other and fold toward each other at the fold line 426 for assembly. In another embodiment, the inboard and outboard panels 422, 424 may couple along a different side with the fold line 426 disposed such that the inboard and outboard panels 422, 424 may fold toward each other for assembly.

Figure 5:
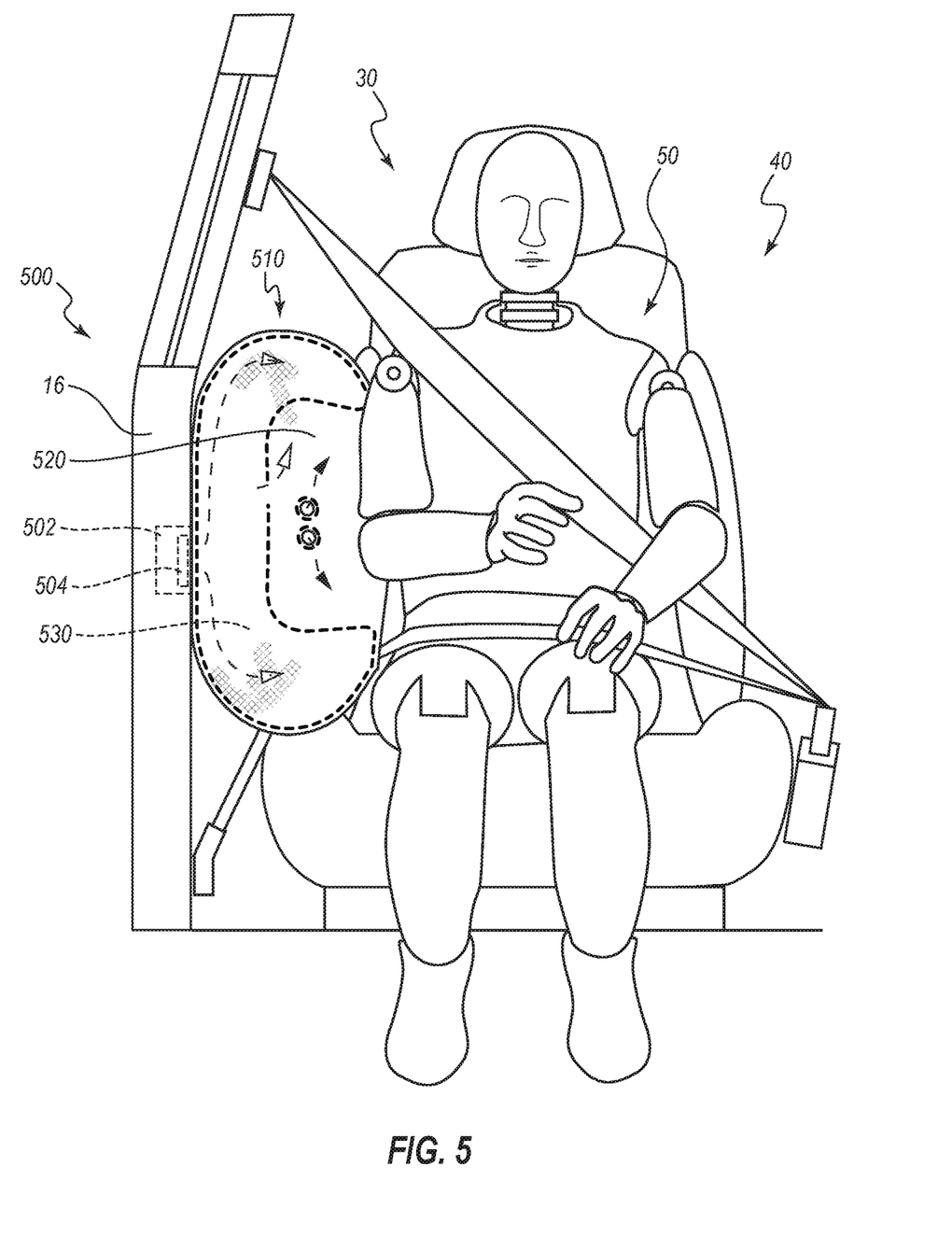
FIG. 5 is a front view of a portion of the interior of the vehicle having an inflatable airbag assembly, according to another embodiment of the present disclosure.

FIG. 5 is a front view of a portion of the interior of the vehicle 10 having an inflatable airbag assembly 500 similar to the inflatable airbag assembly 100 of FIGS. 1A-2B, according to another embodiment of the present disclosure. The vehicle 10, the door/sidewall 16, the vehicle seating position 30, the seat assembly 40, and the occupant 50 are shown for reference. The inflatable airbag assembly 500 comprises the housing 502, inflator 504, and inflatable airbag cushion 510. The first and second chambers 520, 530 of the inflatable airbag cushion 510 are shown for reference. The inflatable airbag assembly 500 may be mounted or installed to an interior portion of the door/sidewall 16 of the vehicle 10. Upon deployment, the inflatable airbag cushion 510 may be disposed adjacent the vehicle seating position 30 so as to receive and support the occupant 50 in a collision event producing lateral acceleration.

Figure 6:
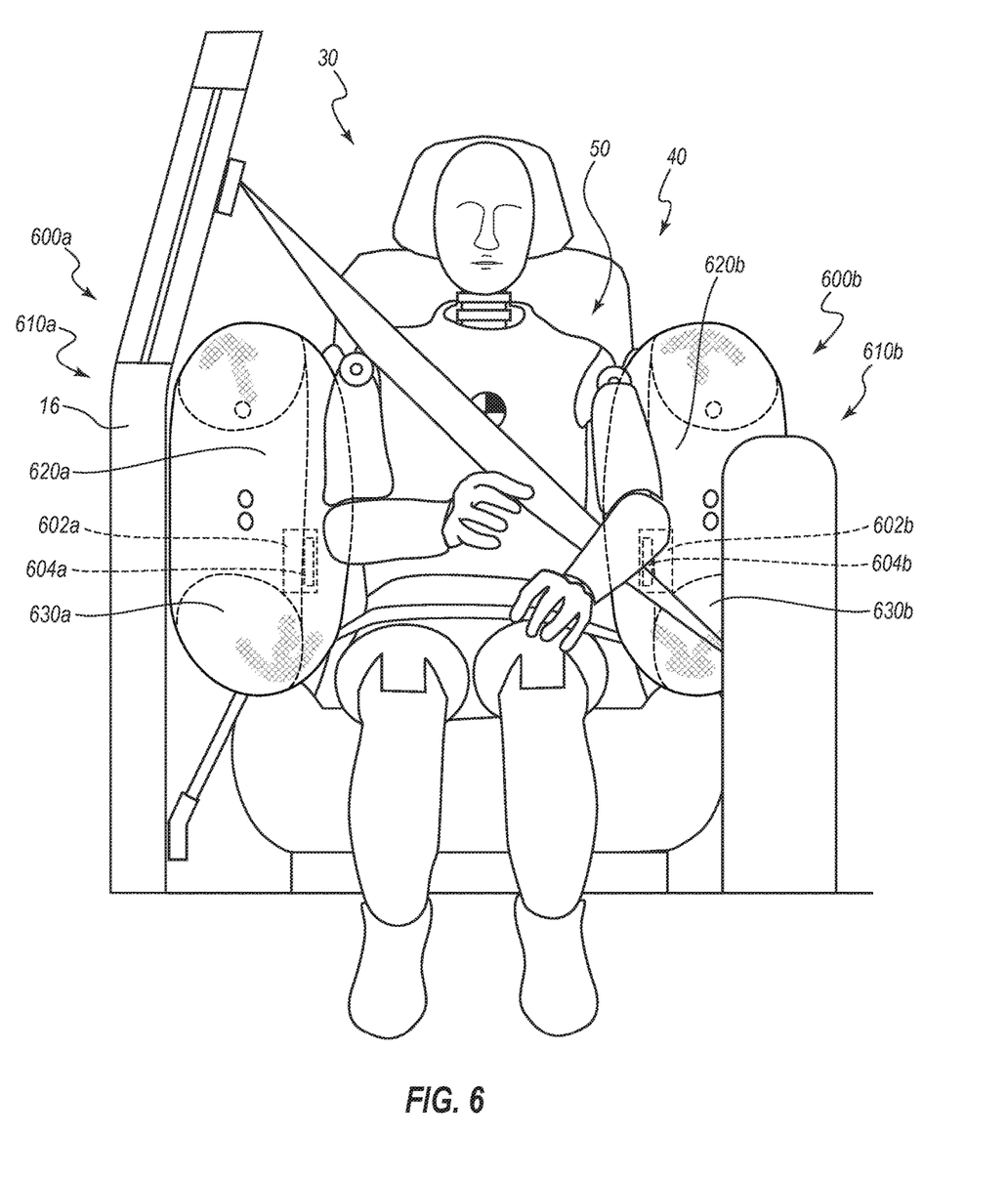
FIG. 6 is a front view of a portion of the interior of the vehicle having two inflatable airbag assemblies, according to another embodiment of the present disclosure.

FIG. 6 is a front view of a portion of the interior of the vehicle 10 having two (2) inflatable airbag assemblies 600a, 600b similar to the inflatable airbag assembly 100 of FIGS. 1A-2B, according to an embodiment of the present disclosure. The two inflatable airbag assemblies 600a, 600b are disposed on opposing lateral sides of the vehicle seating position 30. The inflatable airbag assembly 600a comprises a housing 602a, an inflator 604a, and an inflatable airbag cushion 610a. The first and second chambers 620a and 630a are indicated for reference. The inflatable airbag assembly 600a may be mounted or installed at an outboard aspect of the seatback 44. The inflatable airbag assembly 600b likewise comprises the housing 602b, inflator 604b and inflatable airbag cushion 610b. The first and second chambers 620b, 630b of the inflatable airbag cushion 610b are indicated for reference. The inflatable airbag assembly 600b may, in many respects, mirror the inflatable airbag assembly 600a, and may be mounted or installed at an inboard aspect of the seatback 44.

While the inflatable airbag assembly 600a may afford protection for the occupant 50 against injury from impact against the door/sidewall 16, the inflatable airbag assembly 600b may afford similar protection for the occupant 50 against injury from impact against another vehicle structure, for example, a center console 20, which may be disposed inboard of the vehicle seating position 30.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

The phrase "vehicle occupant position" refers to a position in which an occupant is generally positioned when seated in a seat of a vehicle. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112(f). It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly comprising:
   a housing to be mounted to a seatback of a seat of a vehicle;
   a first inflator; and
   an inflatable airbag cushion to receive inflation gas from the inflator, and to deploy from a packaged state within the housing to a deployed state extending forward from a side of the seatback,
   wherein the inflatable airbag cushion in the deployed state is to be positioned laterally adjacent to a vehicle seating position, the inflatable airbag cushion comprising:
      a first chamber to be inflated by the inflation gas to a first pressure and to be positioned to receive a torso of an occupant moving in a direction transverse to a longitudinal axis of the vehicle, and
      a second chamber to be inflated by the inflation gas to a second pressure greater than the first pressure and to be positioned to receive one or more of a shoulder and a pelvis of an occupant moving in a direction transverse to a longitudinal axis of the vehicle,
      wherein the second chamber is disposed within the first chamber, and is coextensive with a rearward portion, an upward portion, and a lower portion of the first chamber.

2. The inflatable airbag assembly of claim 1, wherein the first chamber has a generally obround shape and a vertical dimension of the first chamber is greater than a horizontal dimension, and
   wherein the first chamber is positioned to receive and support the thoracoabdominal region of the occupant moving in a direction transverse to the longitudinal axis of the vehicle.

3. The inflatable airbag assembly of claim 1, wherein the second chamber has a shape that comprises a generally vertical region, an upper region, and a lower region,
   wherein the upper region, in the deployed state, extends forwardly from an upper portion of the generally vertical region of the second chamber and is positioned to receive the shoulder of the occupant moving in a direction transverse to the longitudinal axis of the vehicle, and
   wherein the lower region, in the deployed state, extends forwardly from a lower portion of the generally vertical region of the second chamber and is positioned to receive the pelvis of the occupant moving in a direction transverse to the longitudinal axis of the vehicle.

4. The inflatable airbag assembly of claim 3, wherein the second chamber has a C shape and the generally vertical region of the second chamber is in fluid communication with the upper region and the lower region of the second chamber.

5. The inflatable airbag assembly of claim 3, wherein the second chamber has a capitalized I shape and the generally vertical region of the second chamber is in fluid communication with the upper region and lower region of the second chamber.

6. The inflatable airbag assembly of claim 3, wherein a lower portion of the upper region of the second chamber, an upper portion of the lower region of the second chamber, and a forward portion of the generally vertical region of the second chamber form a contiguous forward perimeter of the second chamber.

7. The inflatable airbag assembly of claim 3, wherein a rearward portion of the second chamber is coupled adjacent to a rearward portion of the first chamber,
wherein an upper portion of the upper region of the second chamber is coupled with an upper portion of the first chamber at an upper edge of the inflatable airbag cushion, and
wherein a lower portion of the lower region of the second chamber is coupled with a lower portion of the first chamber at a lower edge of the inflatable airbag cushion.

8. The inflatable airbag assembly of claim 1, wherein an exterior of a side panel of the second chamber couples to an immediately adjacent exterior of a side panel of the first chamber, such that the second chamber is exterior to the first chamber.

9. The inflatable airbag assembly of claim 1, wherein the inflatable airbag cushion is configured to deploy from the housing to be disposed between a vehicle seating position and a vehicle side wall.

10. The inflatable airbag assembly of claim 1, wherein the first chamber of the inflatable airbag cushion is inflatable by delivery of inflation gas from the first inflator, and the second chamber of the inflatable airbag cushion is inflatable by delivery of inflation gas from a second inflator.

11. An inflatable airbag assembly comprising:
an inflatable airbag cushion to receive inflation gas from an inflator and to deploy from a packaged state within a seatback of a seat of a vehicle to a deployed state extending forward from a side of the seatback, the inflatable airbag cushion to be positioned, in the deployed state, laterally adjacent to a vehicle seating position, the inflatable airbag cushion comprising:
a low pressure chamber to be inflated by the inflation gas to a first pressure and to be positioned, in the deployed state, to receive a torso of an occupant moving in a direction transverse to a longitudinal axis of the vehicle; and
a high pressure chamber to be inflated by the inflation gas to a second pressure greater than the first pressure and to be positioned, in the deployed state, to receive a shoulder of an occupant at an upper portion of the high pressure chamber and receive a pelvis of an occupant at a lower portion of the high pressure chamber as the occupant moves in a direction transverse to a longitudinal axis of the vehicle,
wherein the high pressure chamber is disposed within the low pressure chamber, and is coextensive with a rearward portion, an upward portion, and a lower portion of the low pressure chamber.

12. The inflatable airbag assembly of claim 11, wherein the low pressure chamber has a vertical dimension greater than a horizontal dimension.

13. The inflatable airbag assembly of claim 11, wherein the high pressure chamber comprises a generally vertical region, an upper region, and a lower region,
wherein the upper region, in the deployed state, extends forwardly from an upper portion of the generally vertical region of the high pressure chamber and is positioned to receive the shoulder of the occupant moving in a direction transverse to the longitudinal axis of the vehicle, and
wherein the lower region, in the deployed state, extends forwardly from a lower portion of the generally vertical region of the high pressure chamber and is positioned to receive the pelvis of the occupant moving in a direction transverse to the longitudinal axis of the vehicle.

14. The inflatable airbag assembly of claim 13, wherein the generally vertical region of the high pressure chamber is in fluid communication with the upper region and the lower region of the high pressure chamber.

15. The inflatable airbag assembly of claim 13, wherein an upper portion of the upper region of the high pressure chamber is coupled with an upper portion of the low pressure chamber, and a lower portion of the lower region of the high pressure chamber is coupled with a lower portion of the low pressure chamber.

16. The inflatable airbag assembly of claim 13, wherein a lower portion of the upper region of the high pressure chamber, an upper portion of the lower region of the high pressure chamber, and a forward portion of the generally vertical region of the high pressure chamber form a contiguous forward perimeter of the high pressure chamber.

17. The inflatable airbag assembly of claim 13, wherein a rearward portion of the high pressure chamber is coupled adjacent to a rearward portion of the low pressure chamber,
wherein an upper portion of the upper region of the high pressure chamber is coupled with an upper portion of the low pressure chamber at an upper edge of the inflatable airbag cushion, and
wherein a lower portion of the lower region of the high pressure chamber is coupled with a lower portion of the low pressure chamber at a lower edge of the inflatable airbag cushion.

18. The inflatable airbag assembly of claim 11, wherein an exterior of a side panel of the high pressure chamber couples to an immediately adjacent exterior of a side panel of the low pressure chamber, such that the high pressure chamber is exterior to the low pressure chamber.

19. The inflatable airbag assembly of claim 11, wherein the inflatable airbag cushion is configured to deploy from the seatback to be disposed between a vehicle seating position and a vehicle side wall.

20. The inflatable airbag assembly of claim 11, wherein the low pressure chamber of the inflatable airbag cushion is inflatable by delivery of inflation gas through a first inflator port, and the high pressure chamber of the inflatable airbag cushion is inflatable by delivery of inflation gas through a second inflator port.

* * * * *